(12) United States Patent
Kim et al.

(10) Patent No.: US 10,211,666 B2
(45) Date of Patent: Feb. 19, 2019

(54) ELECTRONIC DEVICE AND METHOD OF WIRELESS POWER TRANSFER THEREFOR

(71) Applicant: Samsung Electronics Co., Ltd., Suwon-si, Gyeonggi-do (KR)

(72) Inventors: Jongmin Kim, Yongin-si (KR); Sungrae Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 15/261,399

(22) Filed: Sep. 9, 2016

(65) Prior Publication Data

US 2017/0077744 A1    Mar. 16, 2017

(30) Foreign Application Priority Data

Sep. 11, 2015 (KR) .................. 10-2015-0129295

(51) Int. Cl.
| | | |
|---|---|---|
| *H02J 7/04* | (2006.01) | |
| *H02J 7/02* | (2016.01) | |
| *H02J 50/12* | (2016.01) | |
| *H02J 7/00* | (2006.01) | |
| *H04B 5/00* | (2006.01) | |

(52) U.S. Cl.
CPC ............ *H02J 7/042* (2013.01); *H02J 7/0072* (2013.01); *H02J 7/025* (2013.01); *H02J 50/12* (2016.02); *H04B 5/0037* (2013.01); *H02J 7/045* (2013.01); *H02J 7/047* (2013.01)

(58) Field of Classification Search
CPC ....................................................... H02J 7/042
USPC ........................................................ 320/145
See application file for complete search history.

(56) References Cited

U.S. PATENT DOCUMENTS

| | | | |
|---|---|---|---|
| 8,643,326 B2 | 2/2014 | Campanella et al. | |
| 2013/0207601 A1* | 8/2013 | Wu ................... | H02M 3/33576 320/108 |
| 2014/0354223 A1* | 12/2014 | Lee .................. | H02J 5/005 320/108 |
| 2015/0084586 A1* | 3/2015 | Von Novak, III ...... | H02J 7/025 320/108 |
| 2016/0118834 A1* | 4/2016 | Swope ................ | H02J 50/12 320/108 |

* cited by examiner

*Primary Examiner* — Suresh Memula
(74) *Attorney, Agent, or Firm* — Jefferson IP Law, LLP

(57) ABSTRACT

An electronic device and method of wireless power transfer therefor are provided. The electronic device may include a frequency change circuit to produce a first signal of a frequency corresponding to at least one wireless power transfer scheme, a duty cycle change circuit to produce a second signal of a duty cycle corresponding to the at least one wireless power transfer scheme, and a control unit to control at least one of the frequency change circuit and the duty cycle change circuit according to the at least one wireless power transfer scheme. Various other embodiments are also possible.

23 Claims, 14 Drawing Sheets

FIG. 11
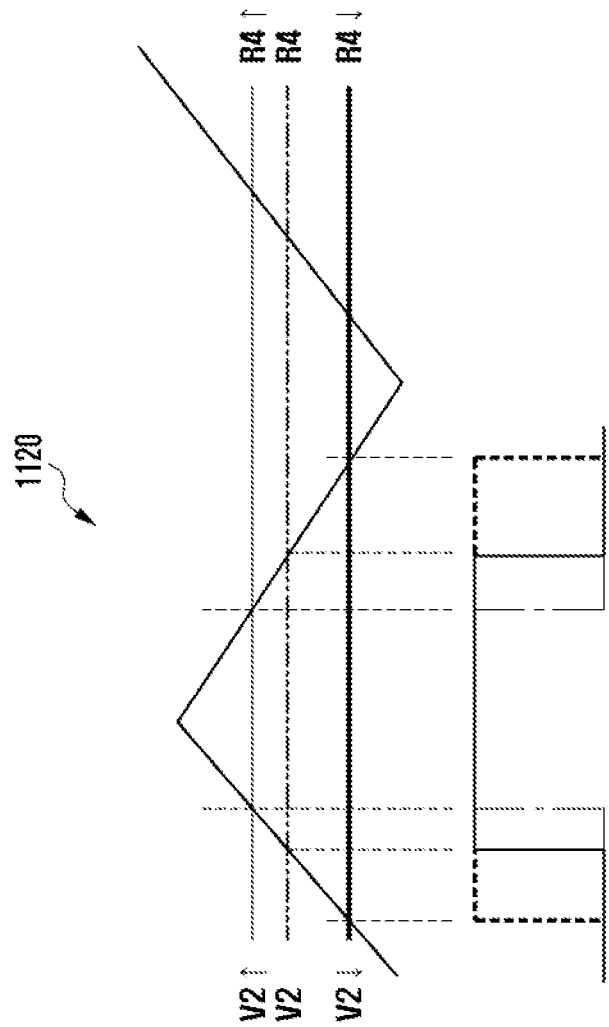
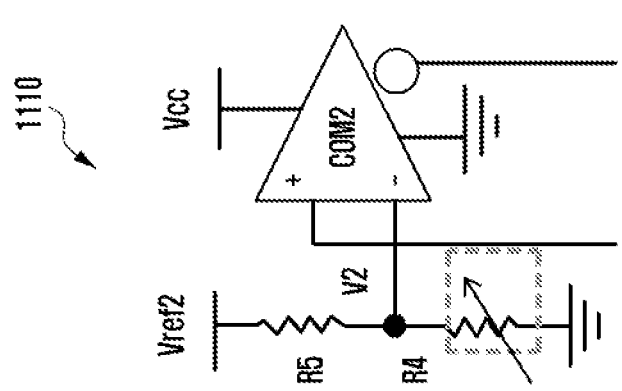

ELECTRONIC DEVICE AND METHOD OF WIRELESS POWER TRANSFER THEREFOR

CROSS-REFERENCE TO RELATED APPLICATION(S)

This application claims the benefit under 35 U.S.C. § 119(a) of a Korean patent application filed on Sep. 11, 2015 in the Korean Intellectual Property Office and assigned Serial number 10-2015-0129295, the entire disclosure of which is hereby incorporated by reference.

TECHNICAL FIELD

The present disclosure relates to an electronic device and a method of wireless power transfer therefor.

BACKGROUND

Advances in wireless power transfer technologies have enabled popularization of electronic devices using wireless charging. In line with this trend, international standards for wireless power transfer have been developed by industry organizations, such as wireless power consortium (WPC), power matters alliance (PMA), and alliance for wireless power (A4WP).

Meanwhile, the WPC, PMA and A4WP standards for wireless power transfer may require different frequencies or duty cycles for wireless charging. In particular, unlike the WPC or PMA standard allowing the frequency and duty cycle to vary, the A4WP standard based on high-frequency resonance may require fixed-frequency output using a solid crystal structure owing to the narrow tolerance. This may make it difficult to achieve compatibility between standards for wireless charging devices.

In addition, as wireless power transfer techniques may be vulnerable to electromagnetic interference (EMI), it is necessary for an electronic device to use a scheme that is least vulnerable to EMI for stable wireless charging.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, such as a wireless charging transmitter, supporting different frequencies or duty cycles in compliance with different standards.

In accordance with an aspect of the present disclosure, an electronic device is provided. The electronic device may include a frequency change circuit configured to produce a first signal of a frequency corresponding to at least one wireless power transfer scheme, a duty cycle change circuit configured to produce a second signal of a duty cycle corresponding to the at least one wireless power transfer scheme, and a control unit configured to control at least one of the frequency change circuit and the duty cycle change circuit according to the at least one wireless power transfer scheme.

In accordance with another aspect of the present disclosure, an electronic device is provided. The electronic device may include a frequency change circuit, a duty cycle change circuit, and a processor functionally connected to the frequency change circuit and the duty cycle change circuit. The processor may be configured to select at least one wireless power transfer scheme, operate the frequency change circuit to change the frequency of a signal in conformance with the wireless power transfer scheme, operate the duty cycle change circuit to change the duty cycle of the signal in conformance with the wireless power transfer scheme, and transmit power with the frequency and duty cycle to an external electronic device.

In accordance with another aspect of the present disclosure, an electronic device is provided. The electronic device may include a frequency change circuit, a duty cycle change circuit, a processor functionally connected to the frequency change circuit and the duty cycle change circuit, and a memory electrically connected to the processor. The memory may store instructions that cause, when executed, the processor to determine at least one wireless power transfer scheme, to operate the frequency change circuit to change the frequency of a signal in conformance with the wireless power transfer scheme, to operate the duty cycle change circuit to change the duty cycle of the signal in conformance with the wireless power transfer scheme, and to transmit power with the frequency and duty cycle to an external electronic device.

In accordance with another aspect of the present disclosure, a method of wireless power transmission for an electronic device is provided. The method may include selecting at least one wireless power transfer scheme, changing the frequency of a signal in conformance with the wireless power transfer scheme, changing the duty cycle of the signal in conformance with the wireless power transfer scheme, and transmitting power with the frequency and duty cycle to an external electronic device.

In a feature of the present disclosure, an electronic device such as a wireless charging transmitter that can support different frequencies or duty cycles in compliance with different standards is provided. To minimize electromagnetic interference (EMI), the electronic device may have a duty feedback mechanism maintaining a 50% duty cycle. To reduce power consumption, the electronic device may switch from multi-channel power transmission to single-channel power transmission. In addition, the electronic device may analyze information regarding the wireless charging environment to select the optimum one among wireless charging standards.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 illustrates duty cycle adjustment using a variable resistor according to an embodiment of the present disclosure;

Throughout the drawings, it should be noted that like reference numbers are used to depict the same or similar elements, features, and structures.

DETAILED DESCRIPTION

Figure 1:
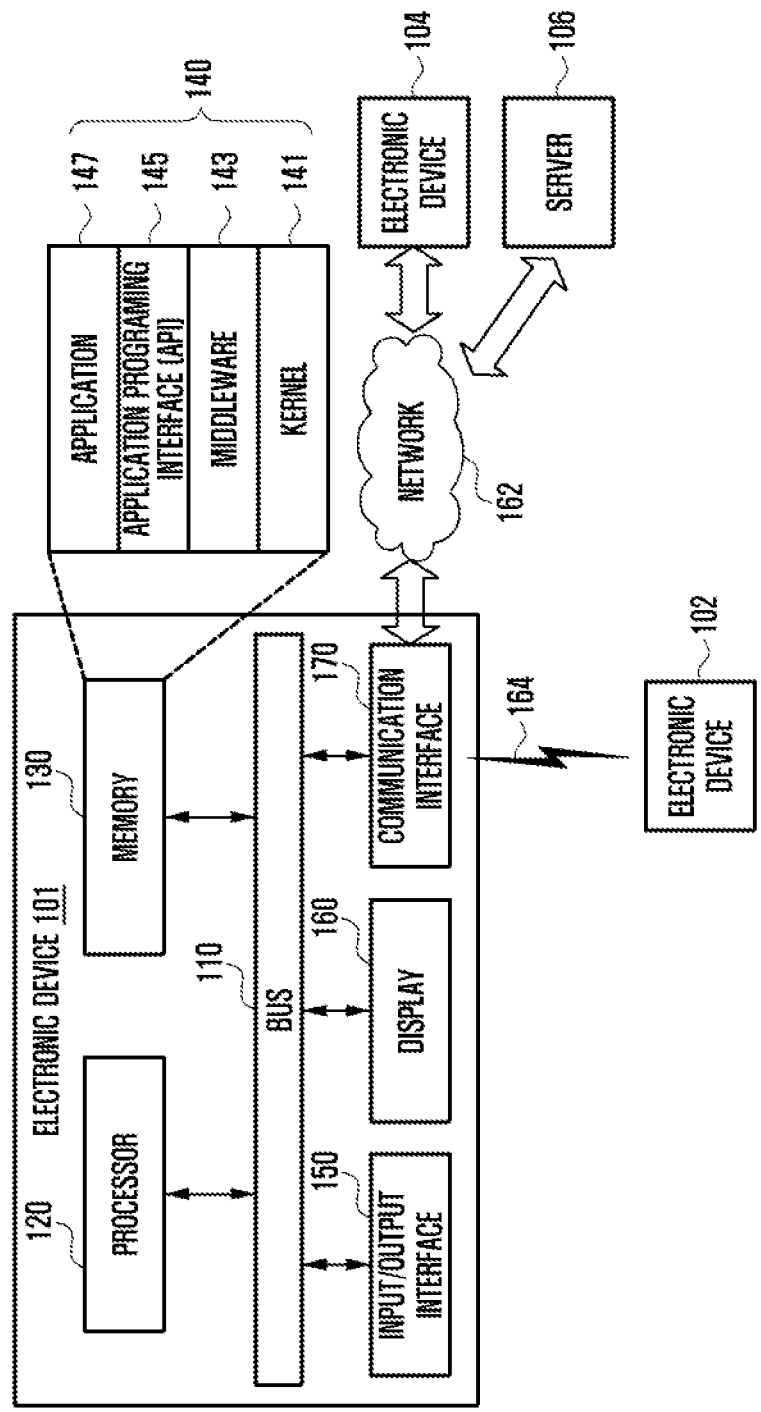
FIG. 1 illustrates a network environment including electronic devices according to an embodiment of the present disclosure.

The following description with reference to the accompanying drawings is provided to assist in a comprehensive understanding of various embodiments of the present disclosure as defined by the claims and their equivalents. It includes various details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate various embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a television (TV), a digital Versatile disc (DVD) player, audio equipment, a refrigerator, an air conditioner, a vacuum cleaner, an oven, a microwave, a washing machine, an air cleaner, a set-top box, a TV box (e.g., Samsung Home-Sync™, Apple TV™, Google TV™, etc.), a game console, an electronic dictionary, an electronic key, a camcorder, or an electronic picture frame.

According to some embodiments, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), a flight data recorder (FDR), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

FIG. 1 illustrates a network environment including electronic devices according to an embodiment of the present disclosure.

Referring to FIG. 1, the electronic device 101 may include a bus 110, a processor 120, a memory 130, a user input module 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include software and/or programs 140, such as a kernel 141, middleware 143, an application programming interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 100.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 100 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 100 and other electronic devices 102 and 104 and/or a server 106. The communication interface 170 can support short range communication protocols 164, e.g. a wireless fidelity (WiFi) protocol, a Bluetooth (BT) protocol, and a near field communication (NFC) protocol, communication networks, e.g. Internet, local area network (LAN), wide area network (WAN), a telecommunication network, a cellular network, and a satellite network, or a plain old telephone service (POTS), or any other similar and/or suitable communication networks, such as network 162, or the like. Each of the electronic devices 102 and 104 may be a same type and/or different types of electronic apparatus.

Figure 2:
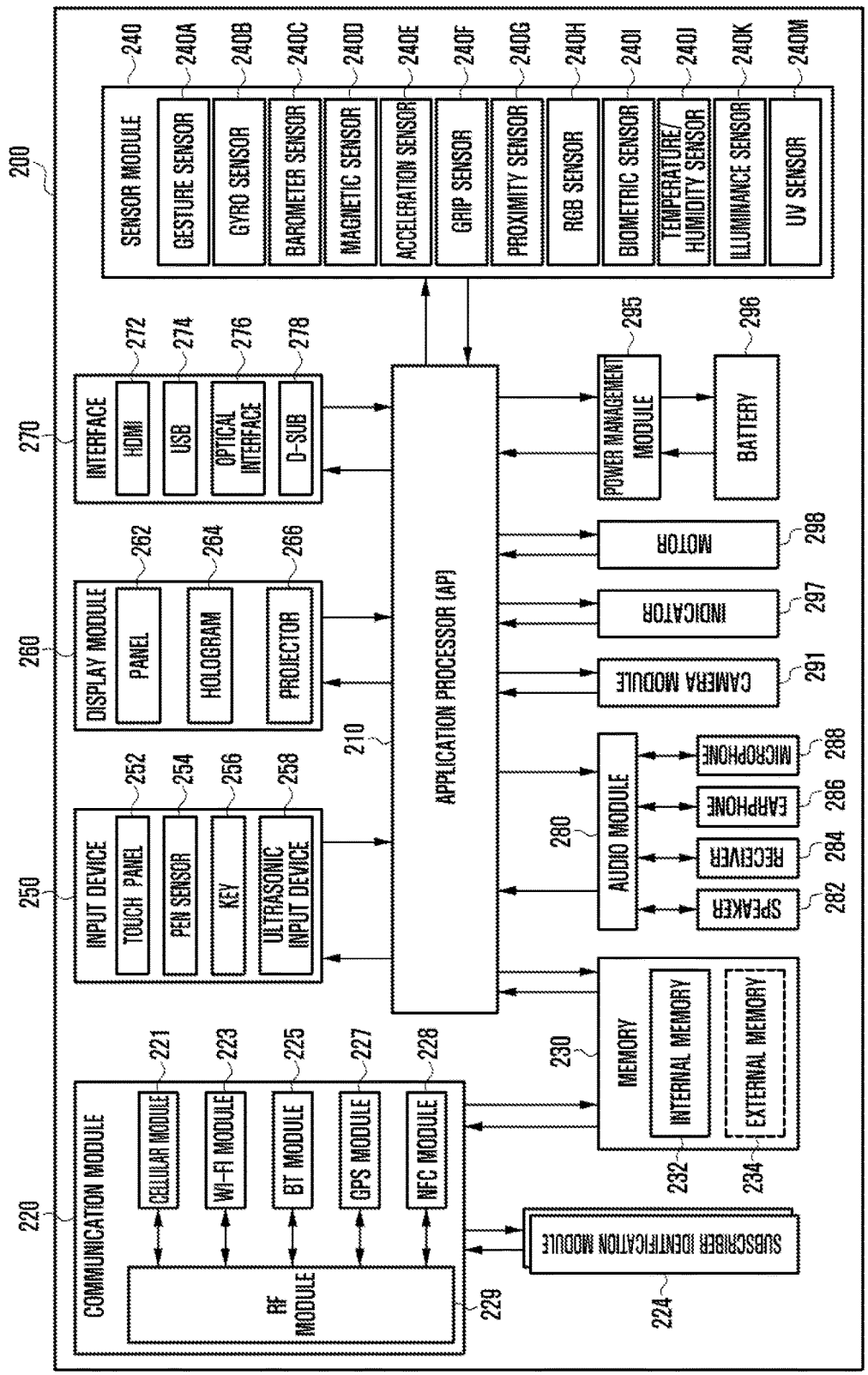
FIG. 2 is a block diagram of an electronic device according to an embodiment of the present disclosure.

FIG. 2 is a block diagram illustrating an electronic device according to an embodiment of the present disclosure. The electronic device of FIG. 2 may form, for example, the whole or part of the electronic device 101 shown in FIG. 1.

Referring to FIG. 2, the electronic device 200 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system (OS) or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 160) may perform a data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 223, a BT module 225, a GPS module 227, an NFC module 228, and a radio frequency (RF) module 229.

The cellular module 221 may offer a voice call, a video call, a message service, an internet service, or the like through a communication network (e.g., long term evolution (LTE), LTE-advanced (LTE-A), code division multiple access (CDMA), wide CDMA (WCDMA), universal mobile telecommunications system (UMTS), wireless broadband (WiBro), or global system for mobile (GSM), etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single integrated circuit (IC) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a power amp module (PAM), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224 may be a specific card formed of SIM and may be inserted into a slot (not shown) formed at a certain place of the electronic device. The SIM card 224 may contain therein an IC card Identifier (ICCID) or an international mobile subscriber identity (IMSI).

The memory 230 (e.g., the memory 130) may include an internal memory 232 and an external memory 234. The internal memory 232 may include, for example, at least one of a volatile memory (e.g., dynamic RAM (DRAM), static RAM (SRAM), synchronous DRAM (SDRAM), etc.) or a nonvolatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the internal memory 232 may have the form of a solid state drive (SSD). The external memory 234 may include a flash drive, e.g., compact flash (CF), secure digital (SD), micro-SD, mini-SD, xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature-humidity sensor 240J, an illumination sensor 240K, and an ultraviolet (UV) sensor 240M. Additionally or alternatively, the sensor module 240 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, liquid crystal display (LCD), active matrix organic light emitting diode (AMOLED), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include, for example, a high-definition multimedia interface (HDMI) 272, a universal serial bus (USB) 274, an optical interface 276, or a D-sub (D-subminiature) 278. The interface 270 may be contained, for example, in the communication interface 160 shown in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an image signal processor (ISP), not shown), or a flash (e.g., LED or xenon lamp, not shown).

The power management module 295 may manage electric power of the electronic device 200. Although not shown, the power management module 295 may include, for example, a power management integrated circuit (PMIC), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of digital multimedia broadcasting (DMB), digital video broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific integrated circuit (ASIC) chip, field-programmable gate arrays (FPGAs), and programmable-logic device, which have been known or are to be developed.

Figure 3:
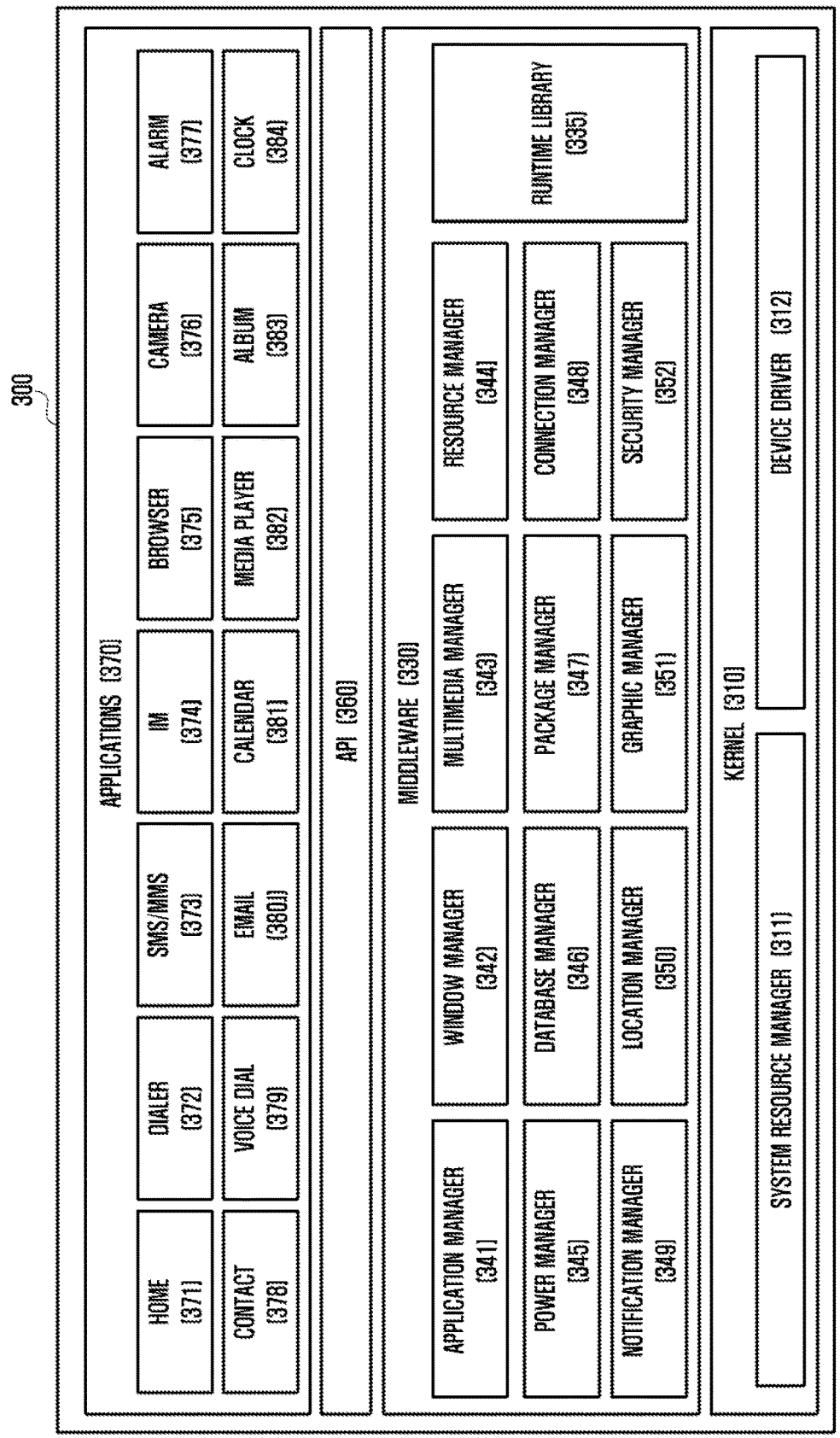
FIG. 3 is a block diagram of a programming module according to an embodiment of the present disclosure.

FIG. 3 is a block diagram of a programming module according to an embodiment of the present disclosure.

Referring to FIG. 3, the programming module may be included (or stored) in the electronic device 100 (e.g., the memory 130) illustrated in FIG. 1 or may be included (or stored) in the electronic device 200 (e.g., the memory 230) illustrated in FIG. 2. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 141) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 134) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Figure 4:
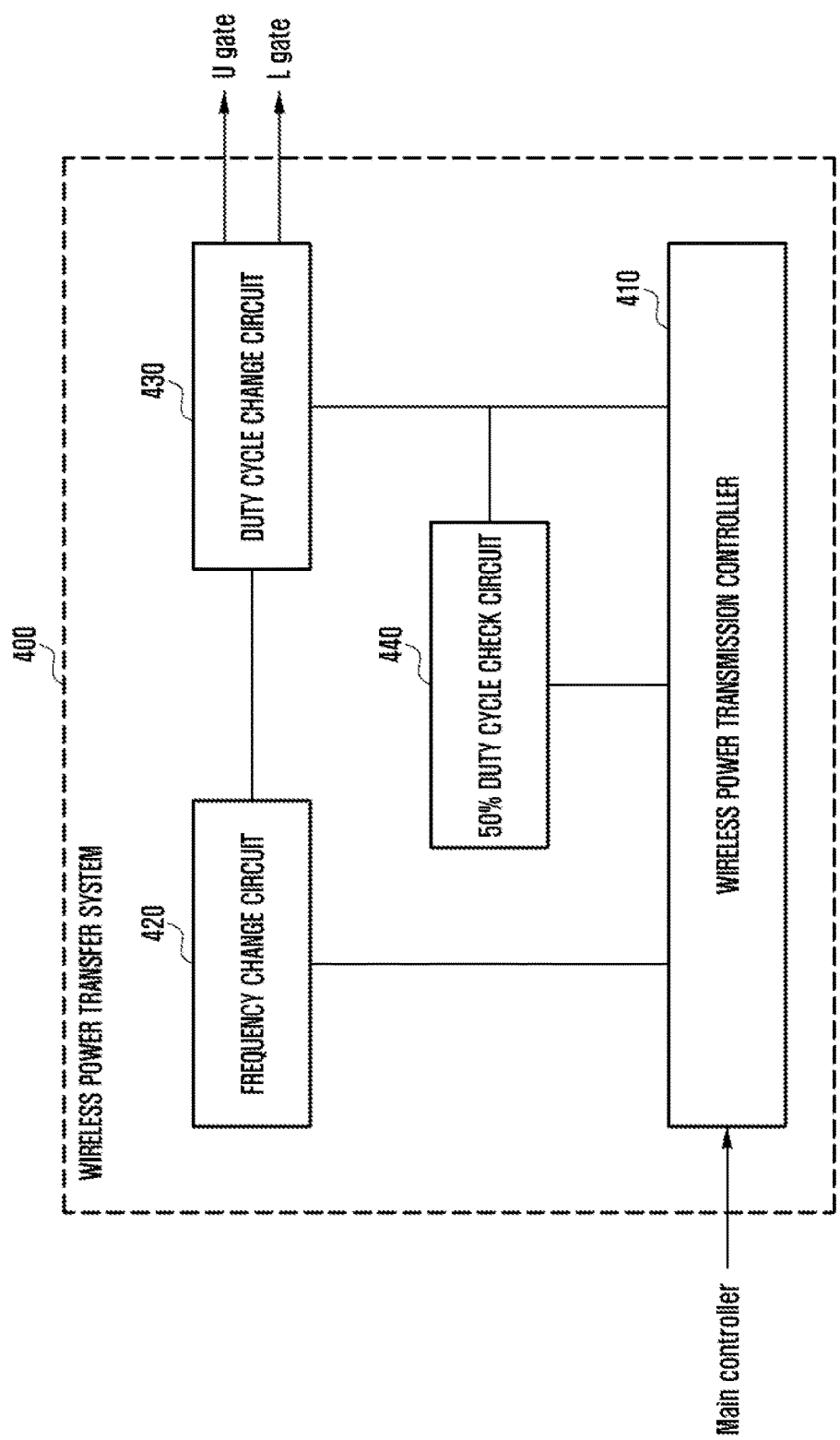
FIG. 4 illustrates a wireless power transfer system of an electronic device according to an embodiment of the present disclosure.

FIG. 4 illustrates a wireless power transfer system of an electronic device according to an embodiment of the present disclosure.

Referring to FIG. 4, the electronic device 101 may include a wireless power transfer system 400. The wireless power transfer system 400 may wirelessly transmit power with different frequencies or duty cycles in accordance with the WPC, PMA and A4WP wireless charging standards. In various embodiments, the electronic device 101 may be a wireless power transmission device. For example, the wireless power transmission device may include a main controller, the wireless power transfer system 400, and a power transmission circuit.

In various embodiments, the wireless power transfer system 400 may include a wireless power transmission controller 410, a frequency change circuit 420, a duty cycle change circuit 430, and a 50% duty cycle check circuit 440. Circuits and signals for an embodiment of the wireless power transfer system 400 are described in connection with FIG. 6.

In various embodiments, the wireless power transmission controller 410 may control at least one of the circuits included in the wireless power transfer system 400.

The wireless power transmission controller 410 may receive at least one piece of information for wireless power transmission from the main controller of the electronic device 101 (e.g. wireless charging transmitter). For example, the wireless power transmission controller 410 may receive information regarding standard schemes, frequencies or duty cycles for the standard schemes, wireless charging environment, and channels from the main controller through inter-integrated circuit (I²C) communication.

The wireless power transmission controller 410 may control the frequency change circuit 420, the duty cycle change circuit 430, or the 50% duty cycle check circuit 440 by use of the information for wireless power transmission received from the main controller. The configuration of the wireless power transmission controller 410 is described in connection with FIG. 5.

In various embodiments, the frequency change circuit 420 may produce a triangle wave of a given frequency under the control of the wireless power transmission controller 410. Such a triangle wave may have a specific frequency and amplitude (peak to peak), and may be a base signal for wireless power transmission.

Figure 6:
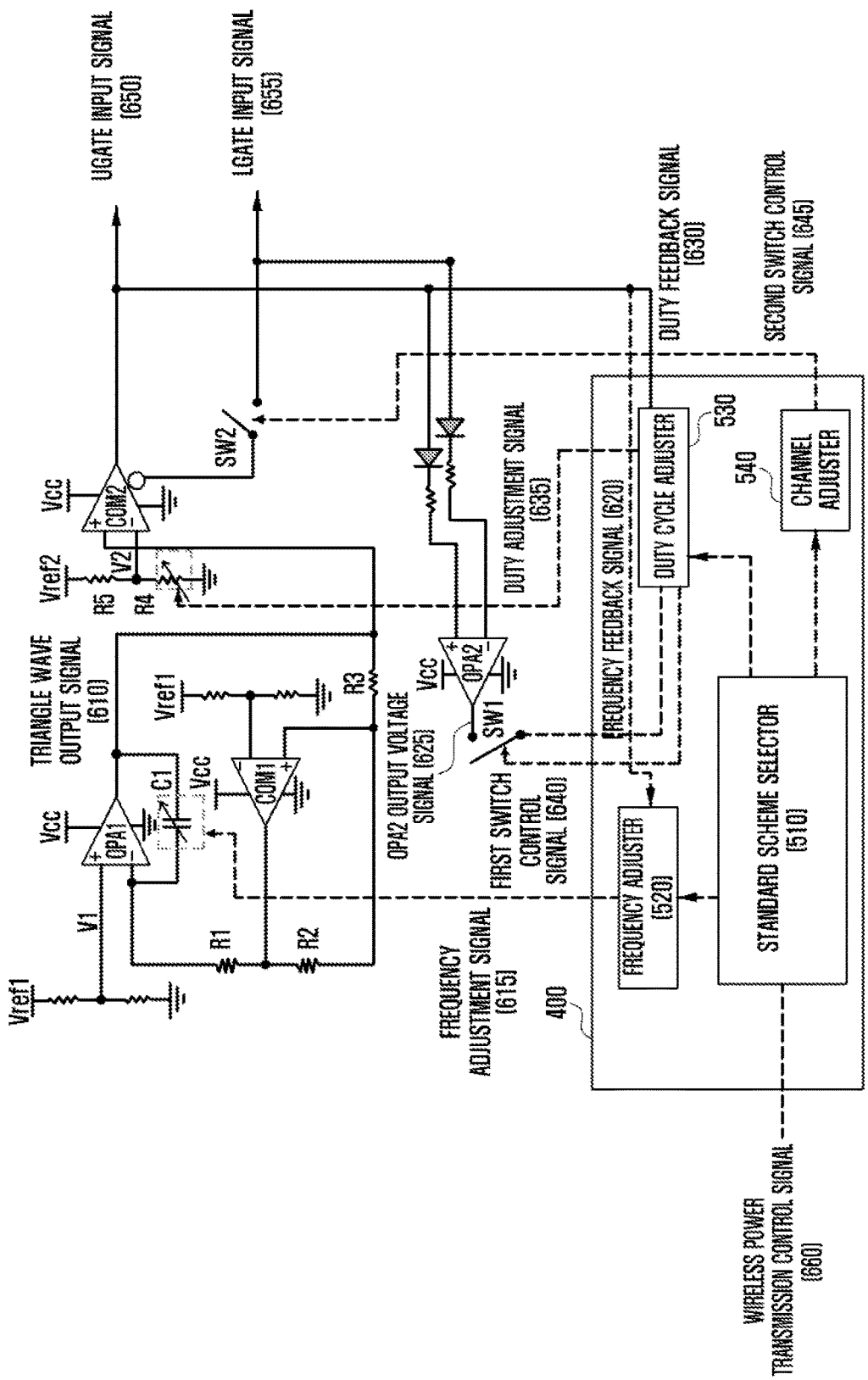
FIG. 6 illustrates signal flows in a wireless power transfer system of an electronic device according to an embodiment of the present disclosure.

In one embodiment, the frequency change circuit 420 may include a variable capacitor (C1), and may adjust the frequency of a triangle wave by changing the capacitance of the variable capacitor under the control of the wireless power transmission controller 410. Alternatively, the frequency change circuit 420 may include a variable resistor, and may adjust the frequency of a triangle wave by changing the resistance of the variable resistor. That is, the frequency change circuit 420 may produce triangle waves of different frequencies in accordance with the WPC, PMA and A4WP standard schemes. A circuit diagram of the frequency change circuit 420 is illustrated in FIG. 6.

In various embodiments, the duty cycle change circuit 430 may adjust the duty cycle for wireless power transmission under the control of the wireless power transmission controller 410.

The duty cycle change circuit 430 may receive a triangle wave of a specific frequency as input from the frequency change circuit 420 and convert the triangle wave into an on/off signal with a specific duty ratio as output by use of a comparator.

In one embodiment, the duty cycle change circuit 430 may include a variable resistor (R4), and may adjust the duty cycle for wireless power transmission by changing the resistance of the variable resistor under the control of the wireless power transmission controller 410. That is, the duty cycle change circuit 430 may produce on/off signals of different duty cycles in conformance with the WPC, PMA and A4WP standard schemes.

In one embodiment, the duty cycle change circuit 430 may include a switch (SW2), and may adjust the channel for wireless power transmission by manipulating the switch under the control of the wireless power transmission controller 410. For example, according to the on/off state of the switch, the duty cycle change circuit 430 may operate as a single channel to output the signal to the first gate (e.g. Ugate) only or operate as multi-channels to output the signal to both the first gate (e.g. Ugate) and the second gate (e.g. Lgate). In comparison to single-channel operation, multi-channel operation may transmit a larger amount of wireless power but may consume a larger amount of power. A circuit diagram of the duty cycle change circuit 430 is illustrated in FIG. 6.

In various embodiments, the 50% duty cycle check circuit 440 may control the duty cycle change circuit 430 to output an on/off signal with a duty cycle of 50 percent. A duty cycle of 50 percent is required by a wireless power transfer scheme based on the A4WP standard using high frequencies. Wireless power transmission with a 50% duty cycle may make the AC waveform output of the AMP uniform, reducing waveform distortion. This contributes to minimization of EMI disturbing wireless charging. That is, the wireless power transfer system 400 may adjust the duty cycle of the on/off signal output to the gate to 50 percent, thereby reducing EMI and increasing the efficiency of wireless charging.

In one embodiment, the 50% duty cycle check circuit 440 may include a switch (SW1), and may adjust the duty cycle for wireless power transmission to 50 percent by manipulating the switch (SW1) under the control of the wireless power transmission controller 410. In the case of a standard scheme for wireless charging not requiring a 50% duty cycle, the 50% duty cycle check circuit 440 may be deactivated by turning off the switch (SW1) under the control of the wireless power transmission controller 410.

Figure 5:
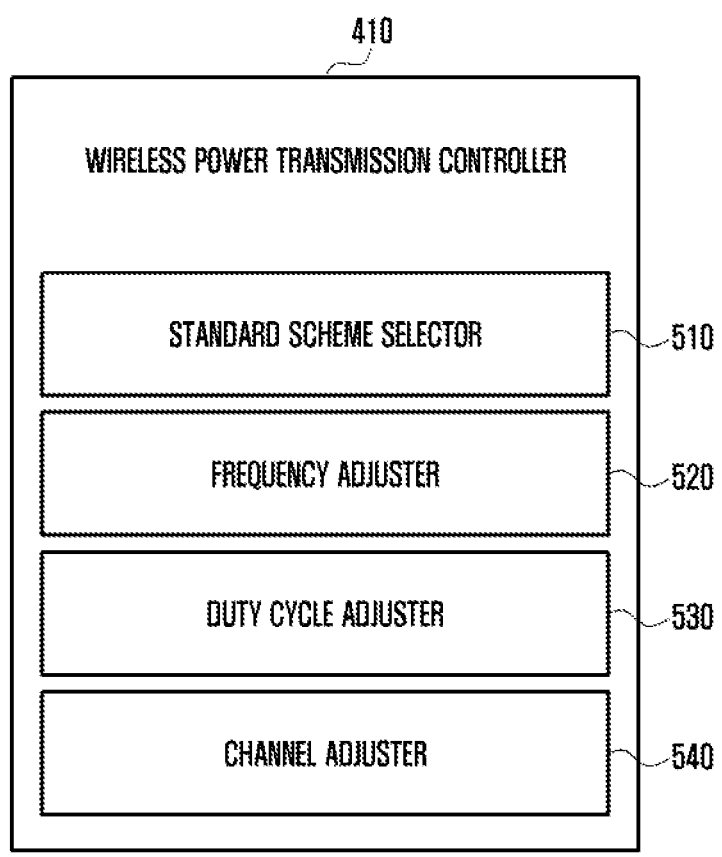
FIG. 5 illustrates a configuration of a wireless power transmission controller in an electronic device according to an embodiment of the present disclosure.

FIG. 5 illustrates a configuration of a wireless power transmission controller in an electronic device according to an embodiment of the present disclosure.

Referring to FIG. 5, to control at least one circuit in the wireless power transfer system 400, the wireless power transmission controller 410 may include a standard scheme selector 510, a frequency adjuster 520, a duty cycle adjuster 530, and a channel adjuster 540.

In various embodiments, the standard scheme selector 510 selects a power transfer scheme among standard or non-standard schemes. The standard scheme selector 510 may generate a signal to control the frequency adjuster 520, the duty cycle adjuster 530, and the channel adjuster 540 on the basis of the selected power transfer scheme.

In one embodiment, the standard scheme selector 510 may select a standard scheme in consideration of wireless power transmission information received from the main controller of the electronic device 101 acting as a wireless charging transmitter. Here, the standard scheme may correspond to one of the WPC, PMA and A4WP standards. The standard scheme selector 510 may receive information regarding a standard scheme and frequency or duty cycle required thereby. In another embodiment, the standard scheme selector 510 may select a standard scheme according to user selection (e.g. selection of a specific standard scheme or switching from a first standard scheme to a second standard scheme).

In various embodiments, the frequency adjuster 520 may send a frequency adjustment signal 615 to the frequency change circuit 420 so that the frequency change circuit 420 produces a triangle wave with a frequency corresponding to the selected standard scheme. For example, the A4WP standard scheme may require a triangle wave with a fixed high frequency of 6.78 MHz, and the WPC or PMA standard scheme may require a triangle wave with a variable low frequency of 100~300 KHz.

In one embodiment, the frequency adjuster 520 may adjust the capacitance (C1) of the variable capacitor in the frequency change circuit 420 by use of the frequency adjustment signal 615. For example, when the frequency depends on the variable capacitance (C1), the frequency of the triangle wave may decrease with the increasing capacitance and increase with the decreasing capacitance.

In various embodiments, the duty cycle adjuster 530 may send a duty adjustment signal 635 to the duty cycle change circuit 430 so that the duty cycle change circuit 430 produces an on/off signal with a duty cycle corresponding to the selected standard scheme. For example, the A4WP standard scheme may require a fixed duty cycle of 50 percent, and the WPC or PMA standard scheme may require duty cycle adjustment (variable duty cycle) according to situations.

In one embodiment, the duty cycle adjuster 530 may adjust the resistance (R4) of the variable resistor in the duty cycle change circuit 430 by use of the duty adjustment signal 635. For example, when the duty cycle depends on the variable resistance (R4), the duty cycle of the on/off signal may decrease with the increasing resistance and increase with the decreasing resistance. The relationship between the variable resistance (R4) and the duty cycle is illustrated in FIG. 11.

In various embodiments, the channel adjuster 540 may perform control to operate one channel (Ugate) or two channels (Ugate and Lgate) according to the selected standard scheme. In one embodiment, when the main controller provides one-channel configuration information, the channel adjuster 540 may perform control for one-channel operation. When wireless charging environment information received from the main controller indicates that the amount of power consumed by the wireless charging receiver is less than or equal to a preset threshold, the channel adjuster 540 may perform control for one-channel operation. That is, when a small amount of power is needed by the wireless charging receiver, there is no need for two-channel operation at the cost of more power consumption.

In one embodiment, the channel adjuster 540 may manipulate the switch (SW2) to adjust the number of channels in the duty cycle change circuit 430. The channel adjuster 540 may turn on or off the switch (SW2) in the duty cycle change circuit 430 by use of a second switch control signal 645.

FIG. 6 illustrates signal flows in a wireless power transfer system of an electronic device according to an embodiment of the present disclosure.

Referring to FIG. 6, the frequency change circuit 420 may include a first operational amplifier (OPA1), a variable capacitor (C1), a first comparator (COM1), resistors (R1, R2, R3), and power sources (Vref1, Vcc). The present disclosure is not limited to the illustrated circuit diagram. For example, one or more elements or components may be altered in number or position.

In one embodiment, the frequency change circuit 420 may generate a frequency change signal 610 and send the frequency change signal 610 to the second comparator (COM2) in the duty cycle change circuit 430.

In one embodiment, the frequency change circuit 420 may adjust the capacitance of the variable capacitor (C1) in response to the frequency adjustment signal 615 from the frequency adjuster 520. That is, the frequency change circuit 420 may produce a triangle wave of a given frequency by adjusting the capacitance.

In various embodiments, the duty cycle change circuit 430 may include a second comparator (COM2), a variable resistor (R4), a resistor (R5), a power source (Vref2), and a second switch (SW2).

In one embodiment, the duty cycle change circuit 430 may receive a triangle wave from the frequency change circuit 420 and produce a signal of a desired duty cycle via the second comparator (COM2).

In one embodiment, the duty cycle change circuit 430 may adjust the resistance of the variable resistor (R4) in response to the duty adjustment signal 635 from the duty cycle adjuster 530. That is, the duty cycle change circuit 430 may produce a signal of a desired duty cycle by adjusting the resistance.

In one embodiment, the duty cycle change circuit 430 may produce a signal input to the gate (Ugate or Lgate). The second switch (SW2) may be turned on or off in response to the second switch control signal 645 from the channel adjuster 540. Hence, the duty cycle change circuit 430 may produce the Ugate input signal 650 only or produce both the Ugate input signal 650 and Lgate input signal 655.

In various embodiments, the 50% duty cycle check circuit 440 may include a second operational amplifier (OPA2), a first switch (SW1), and a power source (Vcc).

In one embodiment, the second operational amplifier (OPA2) of the 50% duty cycle check circuit 440 may receive the Ugate input signal 650 and Lgate input signal 655 as input and produce an OPA2 output voltage signal 625. The OPA2 output voltage signal 625 may be sent to the duty cycle adjuster 530, so that the duty cycle adjuster 530 may check whether the duty cycle change circuit 430 outputs a signal with a 50% duty cycle.

In one embodiment, the first switch (SW1) may be turned on or off in response to the first switch control signal 640 of the duty cycle adjuster 530. Hence, when there is no need to control the gate input signal 650 or 655 at a 50% duty cycle, the first switch (SW1) may be turned off to deactivate the 50% duty cycle check circuit 440.

In various embodiments, the standard scheme selector 510 may select a wireless power transfer scheme in response to a wireless power transmission control signal 660 from the main controller.

In one embodiment, the standard scheme selector 510 may control the frequency adjuster 520, duty cycle adjuster 530, and channel adjuster 540 on the basis of the wireless power transmission control signal 660.

In one embodiment, the frequency adjuster 520 may receive a target frequency indicator from the standard scheme selector 510, and compare the frequency feedback signal 620 with the target frequency to adjust the frequency of the gate input signal 650 or 655.

In one embodiment, the duty cycle adjuster 530 may receive a target duty indicator from the standard scheme selector 510, and compare the duty feedback signal 630 with the target duty cycle to adjust the duty cycle of the gate input signal 650 or 655.

In one embodiment, the channel adjuster 540 may receive a channel count indicator from the standard scheme selector 510 and send the second switch control signal 645 to the second switch (SW2) to control the number of channels to be used.

According to various embodiments, an electronic device may include: a frequency change circuit to produce a first signal of a frequency corresponding to at least one wireless power transfer scheme; a duty cycle change circuit to produce a second signal of a duty cycle corresponding to the at least one wireless power transfer scheme; and a control unit to control at least one of the frequency change circuit and the duty cycle change circuit according to the at least one wireless power transfer scheme.

The at least one wireless power transfer scheme may include standard or non-standard schemes for wireless charging.

The standard schemes for wireless charging may conform to at least one of the wireless power consortium (WPC) standard, the power matters alliance (PMA) standard, and the alliance for wireless power (A4WP) standard.

The frequency change circuit may include a variable capacitor. The frequency change circuit may be configured to receive a frequency adjustment signal corresponding to the at least one wireless power transfer scheme from the control unit, adjust the capacitance of the variable capacitor according to the frequency adjustment signal, and output the first signal.

The frequency change circuit may be configured so that the frequency of the first signal decreases with the increasing capacitance and increases with the decreasing capacitance.

The duty cycle change circuit may include a variable resistor. The duty cycle change circuit may be configured to receive a duty adjustment signal corresponding to the at least one wireless power transfer scheme from the control unit, adjust the resistance of the variable resistor according to the duty adjustment signal, and output the second signal.

The duty cycle change circuit may include a comparator. The duty cycle change circuit may be configured to output the second signal by comparing the first signal with the voltage across the variable resistor.

The duty cycle change circuit may be configured so that the duty cycle of the second signal decreases with the increasing resistance and increases with the decreasing resistance.

The electronic device may further include a channel control circuit. The change control circuit may be configured to receive a channel control signal corresponding to the at least one wireless power transfer scheme from the control unit and adjust the number of wireless power transmission channels.

The electronic device may further include a power transmission circuit. The power transmission circuit may be configured to transmit power with the frequency and duty cycle to an external electronic device.

The electronic device may further include a 50% duty cycle check circuit. The 50% duty cycle check circuit may be configured to check whether the duty cycle of the second signal is 50 percent.

The 50% duty cycle check circuit may include an operational amplifier. The 50% duty cycle check circuit may be configured to send a third signal indicating the output voltage of the operational amplifier to the control unit.

The duty cycle change circuit may include a variable resistor. The control unit may be configured to decrease the resistance of the variable resistor when the third signal is below 0, increase the resistance when the third signal is above 0, and maintain the resistance when the third signal is 0.

According to various embodiments, an electronic device may include a frequency change circuit, a duty cycle change circuit, and a processor functionally connected to the frequency change circuit and the duty cycle change circuit. The processor may be configured to determine at least one wireless power transfer scheme, operate the frequency change circuit to change the frequency of a signal in conformance with the wireless power transfer scheme, operate the duty cycle change circuit to change the duty cycle of the signal in conformance with the wireless power transfer scheme, and transmit power with the frequency and duty cycle to an external electronic device.

The processor may be configured to change the frequency by adjusting the capacitance of a variable capacitor in the frequency change circuit.

The processor may be configured to change the duty cycle by adjusting the resistance of a variable resistor in the duty cycle change circuit.

The electronic device may further include a channel control circuit. The processor may be configured to adjust the number of wireless power transmission channels in conformance with the wireless power transfer scheme by use of the channel control circuit.

The electronic device may further include a 50% duty cycle check circuit. The processor may be configured to check whether the duty cycle of the signal is 50 percent by use of the 50% duty cycle check circuit.

The processor may be configured to adjust the resistance of a variable resistor in the duty cycle change circuit in accordance with the output voltage of the 50% duty cycle check circuit.

The processor may be configured to decrease the resistance of the variable resistor when the output voltage is below 0, increase the resistance when the output voltage is above 0, and maintain the current resistance when the output voltage is 0.

In various embodiments, an electronic device may include a frequency change circuit, a duty cycle change circuit, a processor functionally connected to the frequency change circuit and the duty cycle change circuit, and a memory electrically connected to the processor. The memory may store instructions that cause, when executed, the processor to determine at least one wireless power transfer scheme, to operate the frequency change circuit to change the frequency of a signal in conformance with the wireless power transfer scheme, to operate the duty cycle change circuit to change the duty cycle of the signal in conformance with the wireless power transfer scheme, and to transmit power with the frequency and duty cycle to an external electronic device.

The instructions may cause the processor to change the frequency of the signal by adjusting the capacitance of a variable capacitor in the frequency change circuit.

The instructions may cause the processor to change the duty cycle by adjusting the resistance of a variable resistor in the duty cycle change circuit.

The electronic device may further include a channel control circuit. The instructions may cause the processor to adjust the number of wireless power transmission channels in conformance with the wireless power transfer scheme.

The electronic device may further include a 50% duty cycle check circuit. The instructions may cause the processor to check whether the duty cycle of the signal is 50 percent by use of the 50% duty cycle check circuit.

The instructions may cause the processor to adjust the resistance of a variable resistor in the duty cycle change circuit in accordance with the output voltage of the 50% duty cycle check circuit.

The instructions may cause the processor to decrease the resistance of the variable resistor when the output voltage is below 0, to increase the resistance when the output voltage is above 0, and to maintain the current resistance when the output voltage is 0.

Figure 7:
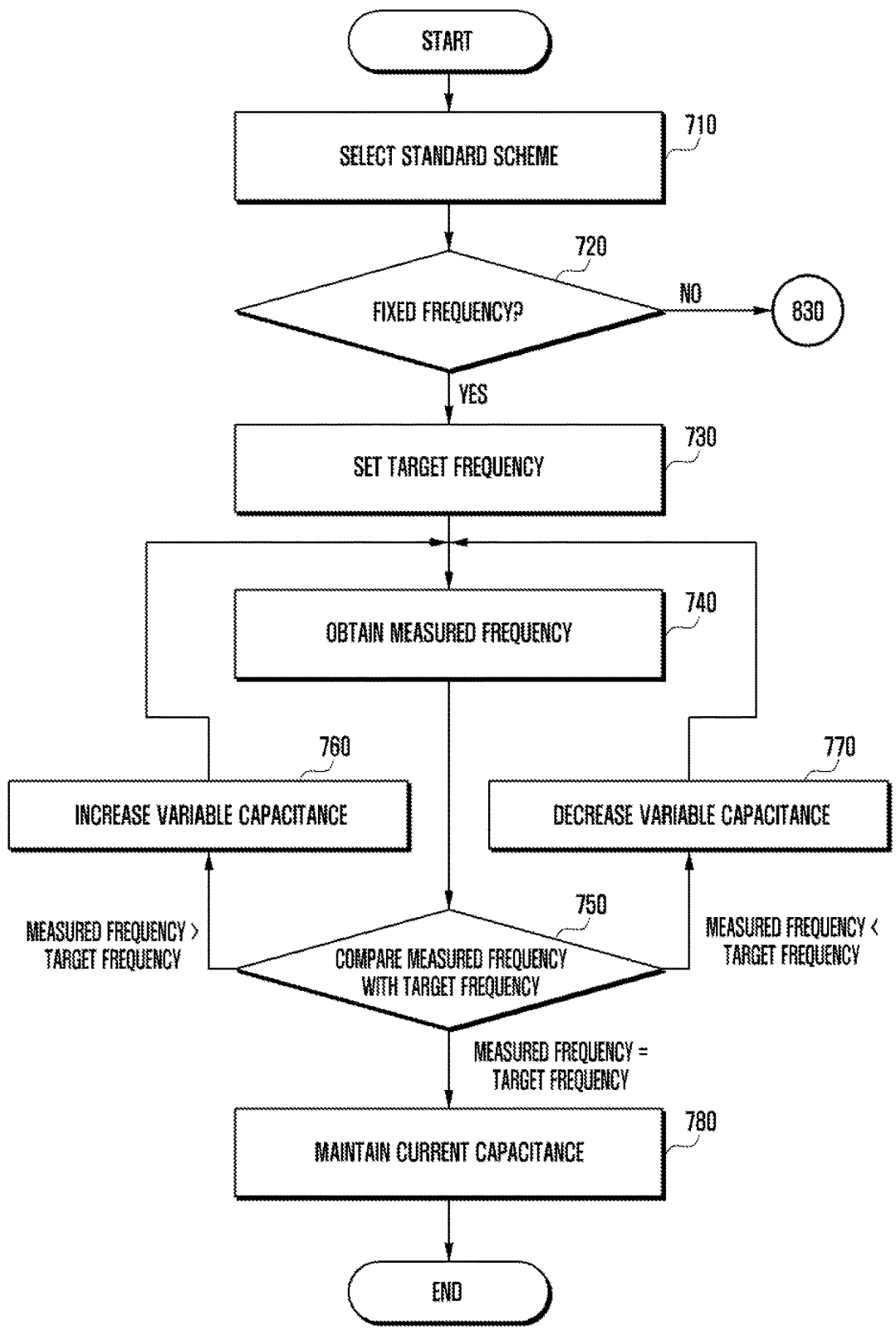
FIG. 7 is a flowchart of a procedure for maintaining a target frequency in a standard scheme requiring a fixed frequency according to an embodiment of the present disclosure.

FIG. 7 is a flowchart of a procedure for maintaining a target frequency in a standard scheme requiring a fixed frequency according to an embodiment of the present disclosure.

Referring to FIG. 7, at operation 710, the electronic device 101 (e.g. standard scheme selector 510) selects a wireless power transfer scheme. For example, one of the WPC, PMA, A4WP standard schemes for wireless charging or a non-standard scheme may be selected. The electronic device 101 may configure settings for the number of channels to operate, and the frequency and duty cycle of the gate input signal according to the selected wireless power transfer scheme.

Figure 8:
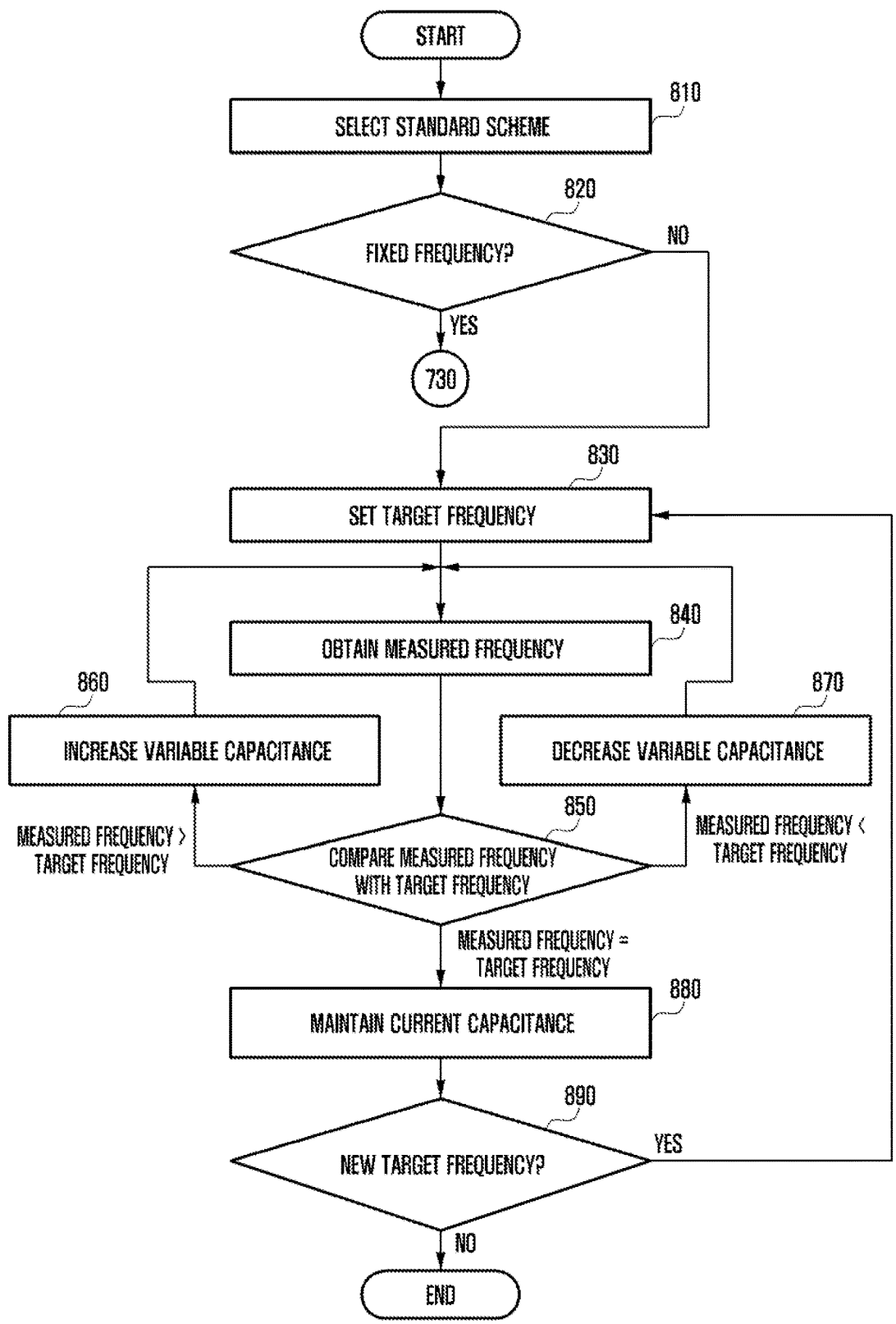
FIG. 8 is a flowchart of a procedure for maintaining a target frequency in a standard scheme not requiring a fixed frequency according to an embodiment of the present disclosure.

At operation 720, the electronic device 101 checks whether the wireless power transfer scheme requires a fixed frequency. If the wireless power transfer scheme requires a fixed frequency, the procedure proceeds to operation 730. If the wireless power transfer scheme does not require a fixed frequency, the procedure proceeds to operation 830 (FIG. 8).

At operation 730, the electronic device 101 (e.g. frequency adjuster 520) sets a target frequency for the wireless power transfer scheme (i.e. the fixed frequency required by the wireless power transfer scheme). For example, the target frequency may be set to 6.78 MHz for the A4WP standard scheme.

At operation 740, the electronic device 101 (e.g. frequency adjuster 520) measures the frequency of at least one gate input signal. For example, the electronic device 101 may identify the frequency of the signal sent by the wireless power transfer system 400 by checking the frequency feedback signal 620 related to the Ugate input signal 650.

At operation 750, the electronic device 101 compares the target frequency with the measured frequency. If the measured frequency is higher than the target frequency, at operation 760, the electronic device 101 increases the capacitance of the variable capacitor (C1). If the measured frequency is lower than the target frequency, at operation 770, the electronic device 101 decreases the capacitance of the variable capacitor (C1). If the measured frequency is equal to the target frequency, at operation 780, the electronic device 101 maintains the current capacitance of the variable capacitor (C1). For example, when the frequency of the signal output by the wireless power transfer system 400 depends on the capacitance of the variable capacitor (C1), the frequency of the signal may decrease with the increasing capacitance and increase with the decreasing capacitance.

FIG. 8 is a flowchart of a procedure for maintaining a target frequency in a standard scheme not requiring a fixed frequency according to an embodiment of the present disclosure.

Referring to FIG. 8, at operation 810, the electronic device 101 (e.g. standard scheme selector 510) selects a wireless power transfer scheme. For example, one of the WPC, PMA, A4WP standard schemes for wireless charging or a non-standard scheme may be selected. The electronic device 101 may configure settings for the number of channels to operate, and the frequency and duty cycle of the gate input signal according to the selected wireless power transfer scheme.

At operation 820, the electronic device 101 checks whether the wireless power transfer scheme requires a fixed frequency. If the wireless power transfer scheme requires a fixed frequency, the procedure proceeds to operation 730 (FIG. 7). If the wireless power transfer scheme does not require a fixed frequency, the procedure proceeds to operation 830.

At operation 830, the electronic device 101 (e.g. frequency adjuster 520) sets a target frequency within the frequency range allowed for the wireless power transfer scheme. For example, the target frequency may be set to a specific frequency between 100 and 200 KHz for the WPC standard scheme, or to a specific frequency between 200 and 300 KHz for the PMA standard scheme.

At operation 840, the electronic device 101 (e.g. frequency adjuster 520) measures the frequency of at least one gate input signal. For example, the electronic device 101 may identify the frequency of the signal sent by the wireless power transfer system 400 by checking the frequency feedback signal 620 related to the Ugate input signal 650.

At operation 850, the electronic device 101 (e.g. frequency adjuster 520) compares the target frequency with the measured frequency. If the measured frequency is higher than the target frequency, at operation 860, the electronic device 101 increases the capacitance of the variable capacitor (C1). If the measured frequency is lower than the target frequency, at operation 870, the electronic device 101 decreases the capacitance of the variable capacitor (C1). If the measured frequency is equal to the target frequency, at operation 880, the electronic device 101 maintains the current capacitance of the variable capacitor (C1). For example, when the frequency of the signal output by the wireless power transfer system 400 depends on the capacitance of the variable capacitor (C1), the frequency of the signal may decrease with the increasing capacitance and increase with the decreasing capacitance.

At operation 890, the electronic device 101 (e.g. frequency adjuster 520) checks whether the target frequency is newly updated. For example, as the WPC or PMA standard scheme allows a variable frequency within a specific frequency range, it may be necessary for the electronic device 101 to check whether the target frequency is newly changed by the main controller.

Figure 9:
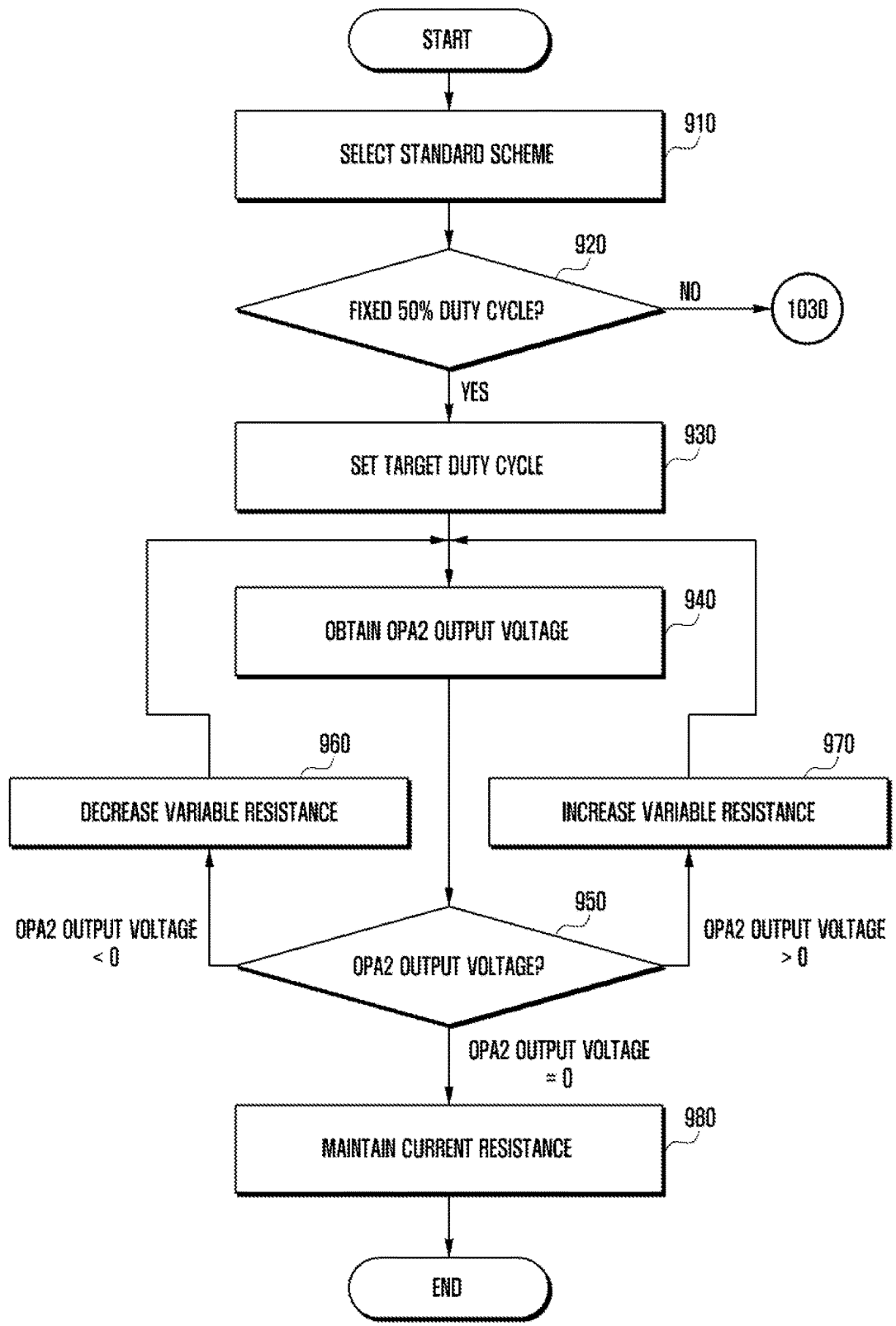
FIG. 9 is a flowchart of a procedure for maintaining a target duty cycle in a standard scheme requiring a fixed duty cycle according to an embodiment of the present disclosure.

FIG. 9 is a flowchart of a procedure for maintaining a target duty cycle in a standard scheme requiring a fixed duty cycle according to an embodiment of the present disclosure.

Referring to FIG. 9, at operation 910, the electronic device 101 (e.g. standard scheme selector 510) selects a wireless power transfer scheme. For example, one of the WPC, PMA, A4WP standard schemes for wireless charging or a non-standard scheme may be selected. The electronic device 101 may configure settings for the number of channels to operate, and the frequency and duty cycle of the gate input signal according to the selected wireless power transfer scheme.

Figure 10:
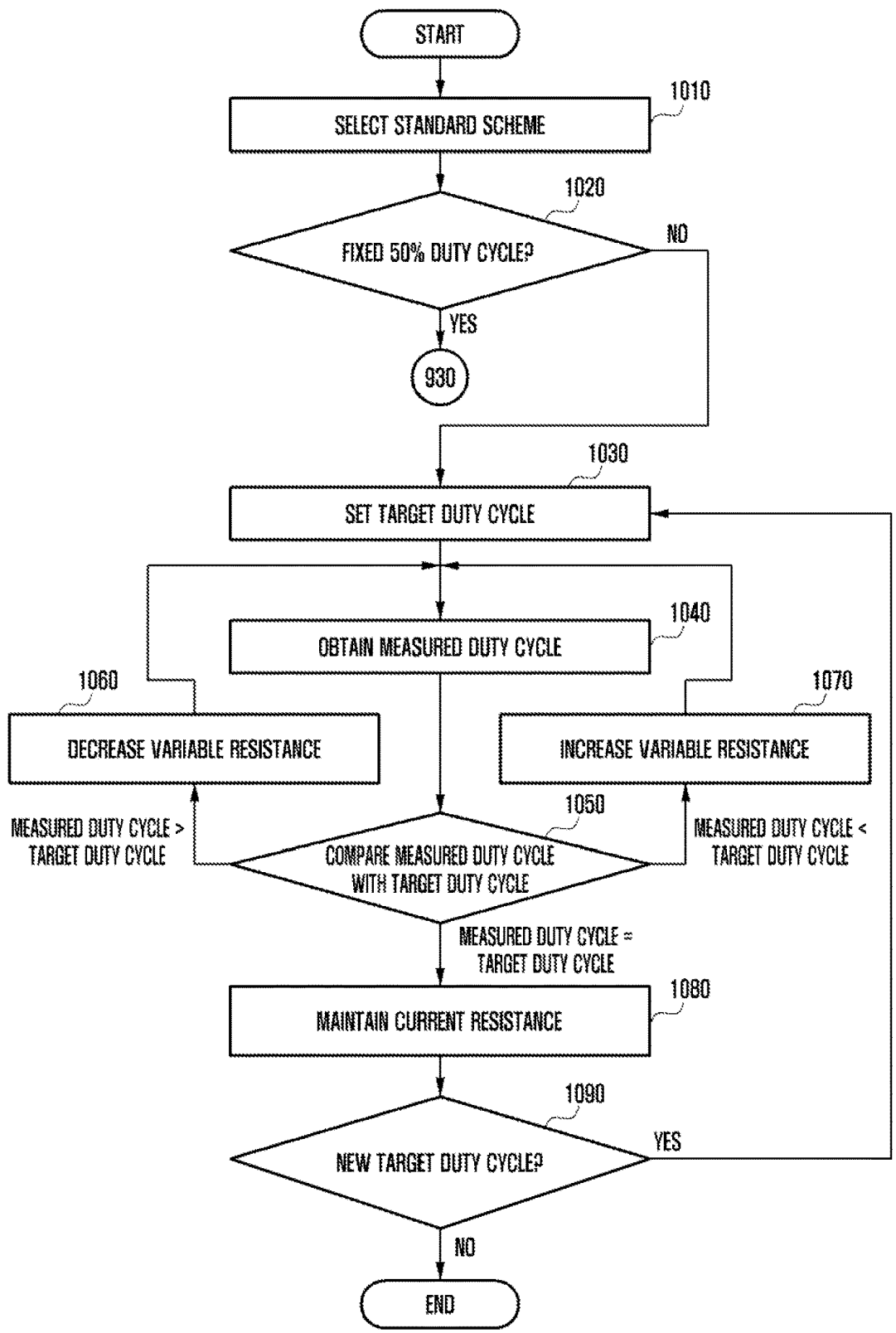
FIG. 10 is a flowchart of a procedure for maintaining a target duty cycle in a standard scheme not requiring a fixed duty cycle according to an embodiment of the present disclosure.

At operation 920, the electronic device 101 (e.g. duty cycle adjuster 530) checks whether the wireless power transfer scheme requires a fixed duty cycle of 50 percent. If the wireless power transfer scheme requires a fixed duty cycle of 50 percent, the procedure proceeds to operation 930. If the wireless power transfer scheme does not require a fixed duty cycle, the procedure proceeds to operation 1030 (FIG. 10).

At operation 930, the electronic device 101 (e.g. duty cycle adjuster 530) sets a target duty cycle for the wireless power transfer scheme (i.e. the fixed duty cycle required by the wireless power transfer scheme). For example, the target duty cycle may be set to 50 percent for the A4WP standard scheme.

At operation 940, the electronic device 101 (e.g. duty cycle adjuster 530) measures the output voltage of the second operational amplifier (OPA2). For example, in the case of a 50% duty cycle, as the ratio of "on" to "off" in the wireless power transmission signal is 1, the output voltage of the second operational amplifier (OPA2) may converge to 0.

At operation 950, the electronic device 101 (e.g. duty cycle adjuster 530) checks whether the output voltage of the second operational amplifier (OPA2) is zero. If the output voltage of the second operational amplifier (OPA2) is below zero, at operation 960, the electronic device 101 decreases the resistance of the variable resistor (R4).

If the output voltage of the second operational amplifier (OPA2) is above zero, at operation 970, the electronic device 101 increases the resistance of the variable resistor (R4).

If the output voltage of the second operational amplifier (OPA2) is zero, at operation 980, the electronic device 101 maintains the current resistance of the variable resistor (R4). The relationship between the duty cycle and the variable resistance (R4) is shown in FIG. 11.

FIG. 10 is a flowchart of a procedure for maintaining a target duty cycle in a standard scheme not requiring a fixed duty cycle according to an embodiment of the present disclosure.

Referring to FIG. 10, at operation 1010, the electronic device 101 (e.g. standard scheme selector 510) selects a wireless power transfer scheme. For example, one of the WPC, PMA, A4WP standard schemes for wireless charging or a non-standard scheme may be selected. The electronic device 101 may configure settings for the number of channels to operate, and the frequency and duty cycle of the gate input signal according to the selected wireless power transfer scheme.

At operation 1020, the electronic device 101 (e.g. duty cycle adjuster 530) checks whether the wireless power transfer scheme requires a fixed duty cycle of 50 percent. If the wireless power transfer scheme requires a fixed duty cycle of 50 percent, the procedure proceeds to operation 930 (FIG. 9). If the wireless power transfer scheme does not require a fixed duty cycle, the procedure proceeds to operation 1030.

At operation 1030, the electronic device 101 (e.g. duty cycle adjuster 530) sets a target duty cycle for the wireless power transfer scheme. For example, for the WPC or PMA standard scheme, the target duty cycle may be set to a percent value (e.g. 40% or 60%) so that the "on" time is not equal to the "off" time.

At operation 1040, the electronic device 101 (e.g. duty cycle adjuster 530) measures the duty cycle of at least one gate input signal. For example, the electronic device 101 may identify the duty cycle of the signal sent by the wireless power transfer system 400 by checking the duty feedback signal 630 related to the Ugate input signal 650.

At operation 1050, the electronic device 101 (e.g. duty cycle adjuster 530) compares the measured duty cycle with the target duty cycle. If the measured duty cycle is higher than the target duty cycle, at operation 1060, the electronic device 101 (e.g. duty cycle adjuster 530) decreases the resistance of the variable resistor (R4).

If the measured duty cycle is lower than the target duty cycle, at operation 1070, the electronic device 101 (e.g. duty cycle adjuster 530) increases the resistance of the variable resistor (R4).

If the measured duty cycle is equal to the target duty cycle, at operation 1080, the electronic device 101 (e.g. duty cycle adjuster 530) maintains the current resistance of the variable resistor (R4). The relationship between the duty cycle and the variable resistance (R4) is shown in FIG. 11.

At operation 1090, the electronic device 101 (e.g. duty cycle adjuster 530) checks whether the target duty cycle is newly updated. For example, as the WPC or PMA standard scheme allows a variable duty cycle depending upon the situation, it may be necessary for the electronic device 101 to check whether the target duty cycle is newly changed by the main controller.

FIG. 11 illustrates duty cycle adjustment using a variable resistor according to an embodiment of the present disclosure.

Referring to FIG. 11, the electronic device 101 (e.g. duty cycle adjuster 530) may adjust the duty cycle of a signal by use of a duty cycle change circuit 1110. The triangle wave generated by the frequency change circuit 420 may be applied to the non-inverting input terminal of the second comparator (COM2), and a voltage (V2) may be applied to the inverting input terminal thereof. Here, the voltage (V2) applied to the inverting input terminal may depend upon the resistance of the variable resistor (R4) as described in Equation 1 below. For example, the voltage (V2) may increase with the increasing resistance of the variable resistor (R4).

$$V2=(R4/(R4+R5))*Vref2 \qquad \text{Equation 1}$$

In various embodiments, when the voltage (V2) applied to the inverting input terminal of the second comparator (COM2) increases, the duty cycle of a signal may decrease as shown by a graph 1120. For example, when the triangle wave generated by the frequency change circuit 420 is applied to the non-inverting input terminal of the second comparator (COM2), the "on" time of the signal output by the second comparator (COM2) may shorten with the increasing voltage (V2) applied to the inverting input terminal. In reverse, the "on" time of the signal output by the second comparator (COM2) may lengthen with the decreasing voltage (V2) applied to the inverting input terminal. Consequently, the electronic device 101 can adjust the duty cycle of the wireless power transmission signal.

Figure 12:
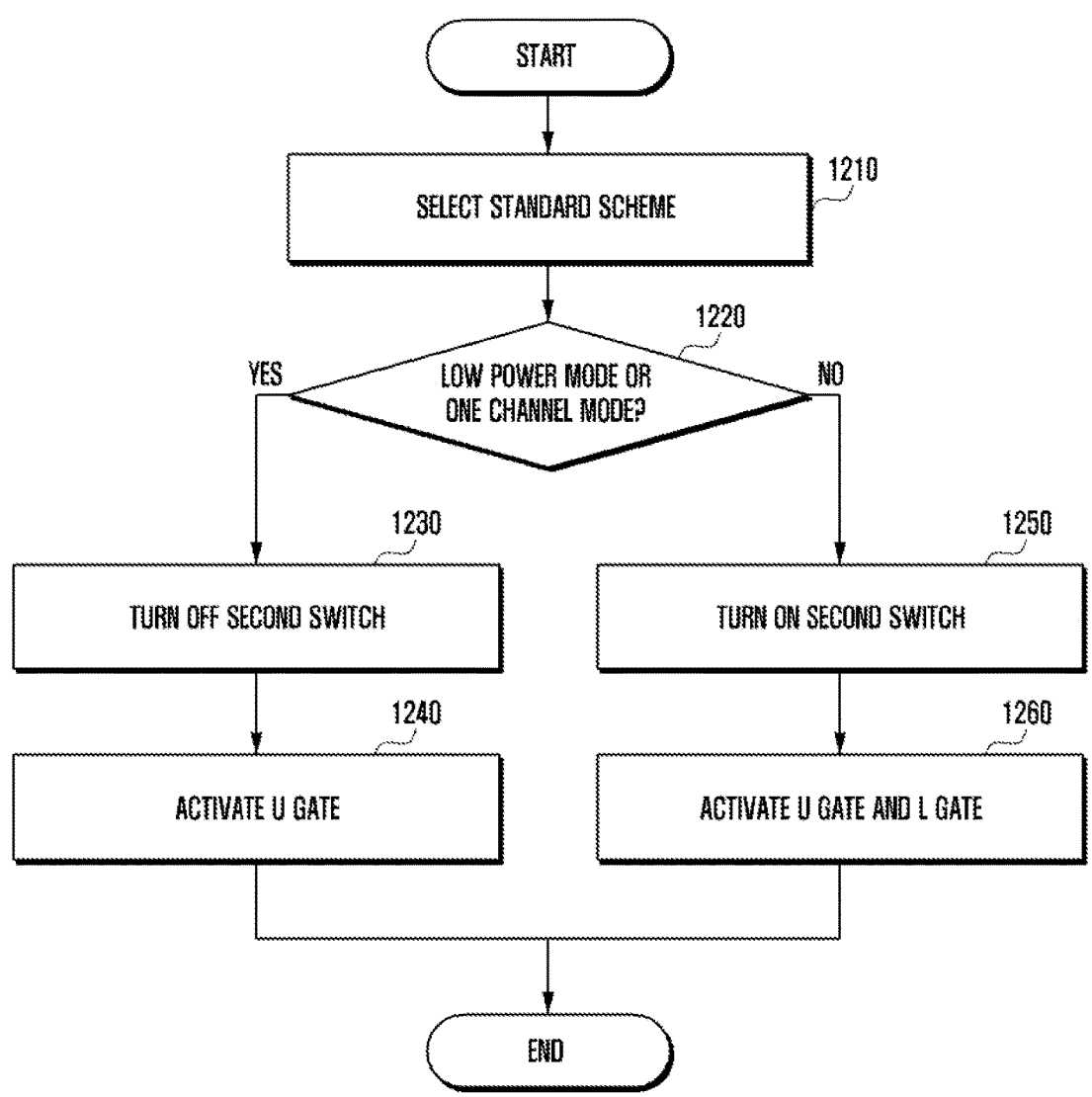
FIG. 12 is a flowchart of a procedure for adjusting power transmission channel using switches according to an embodiment of the present disclosure.

FIG. 12 is a flowchart of a procedure for adjusting power transmission channel using switches according to an embodiment of the present disclosure.

Referring to FIG. 12, at operation 1210, the electronic device 101 (e.g. standard scheme selector 510) selects a wireless power transfer scheme. For example, one of the WPC, PMA, A4WP standard schemes or a non-standard scheme may be selected. The electronic device 101 may configure settings for the number of channels to operate, and the frequency and duty cycle of the gate input signal according to the selected wireless power transfer scheme.

At operation 1220, the electronic device 101 checks whether the wireless power transfer scheme uses low power mode (or one channel mode). Here, the low power mode may be used when the amount of power consumed by the wireless charging receiver is less than or equal to a preset threshold. If the wireless power transfer scheme uses low power mode, the procedure proceeds to operation 1230. If the wireless power transfer scheme does not use low power mode, the procedure proceeds to operation 1250.

For the low power mode, at operation 1230, the electronic device 101 (e.g. channel adjuster 540) turns off the second switch. For example, the electronic device 101 may manipulate the second switch control signal 645 of the channel adjuster 540 to turn off the second switch.

At operation 1240, the electronic device 101 outputs only the Ugate input signal 650 after turning off of the second switch. This enables the electronic device 101 to reduce unnecessary power consumption.

For high power mode (or two channel mode), at operation 1250, the electronic device 102 (e.g. channel adjuster 540) turns on the second switch. For example, the electronic device 101 may manipulate the second switch control signal 645 of the channel adjuster 540 to turn on the second switch.

At operation 1260, the electronic device 101 outputs both the Ugate input signal 650 and the Lgate input signal 655 after turning on of the second switch.

Figure 13:
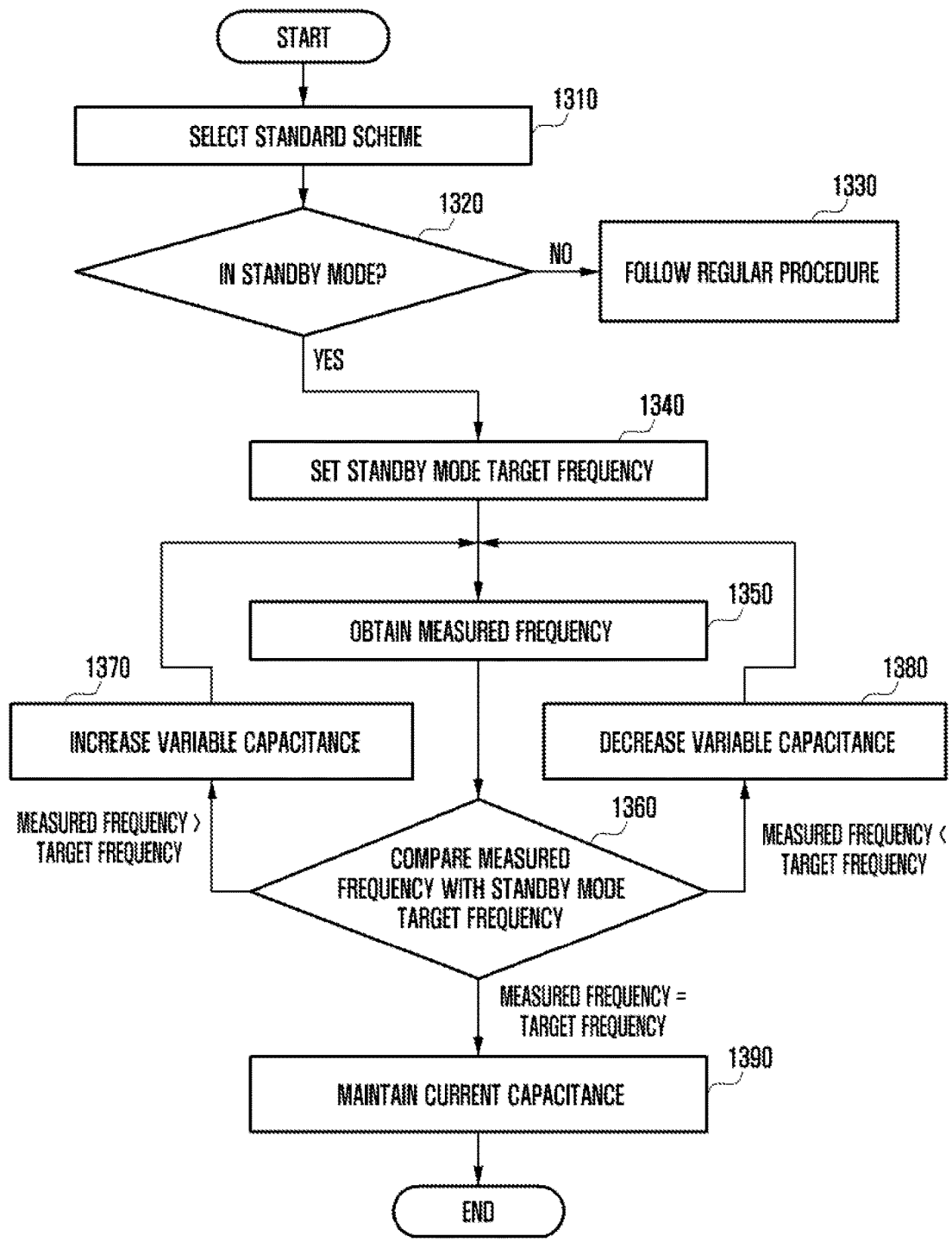
FIG. 13 is a flowchart of a procedure for frequency adjustment in a standby mode according to an embodiment of the present disclosure.

FIG. 13 is a flowchart of a procedure for frequency adjustment in a standby mode according to an embodiment of the present disclosure.

Referring to FIG. 13, at operation 1310, the electronic device 101 (e.g. standard scheme selector 510) selects a wireless power transfer scheme. For example, one of the WPC, PMA, A4WP standard schemes or a non-standard scheme may be selected. The electronic device 101 may configure settings for the number of channels to operate, and the frequency and duty cycle of the gate input signal according to the selected wireless power transfer scheme.

At operation 1320, the electronic device 101 checks whether the wireless charging receiver is in standby mode. If the wireless charging receiver is not in standby mode, at operation 1330, the electronic device 101 may continue wireless power transmission according to the regular procedure. If the wireless charging receiver is in standby mode, the procedure proceeds to operation 1340.

At operation 1340, the electronic device 101 sets a standby mode target frequency for the wireless power transfer scheme. When the wireless charging receiver is in standby mode, as the amount of power consumed thereby may reduce, the electronic device 101 may set a standby mode target frequency lower than the regular target frequency for the wireless power transfer scheme.

At operation 1350, the electronic device 101 (e.g. frequency adjuster 520) measures the frequency of at least one gate input signal. For example, the electronic device 101 may identify the frequency of the signal sent by the wireless power transfer system 400 by checking the frequency feedback signal 620 related to the Ugate input signal 650.

At operation 1360, the electronic device 101 (e.g. frequency adjuster 520) compares the standby mode target frequency with the measured frequency.

If the measured frequency is higher than the standby mode target frequency, at operation 1370, the electronic device 101 (e.g. frequency adjuster 520) increases the capacitance of the variable capacitor (C1).

If the measured frequency is lower than the standby mode target frequency, at operation 1380, the electronic device 101 (e.g. frequency adjuster 520) decreases the capacitance of the variable capacitor (C1).

If the measured frequency is equal to the standby mode target frequency, at operation 1390, the electronic device 101 (e.g. frequency adjuster 520) maintains the current capacitance of the variable capacitor (C1). For example, when the frequency of the signal output by the wireless power transfer system 400 depends on the capacitance of the variable capacitor (C1), the frequency of the signal may decrease with the increasing capacitance and increase with the decreasing capacitance.

Figure 14:
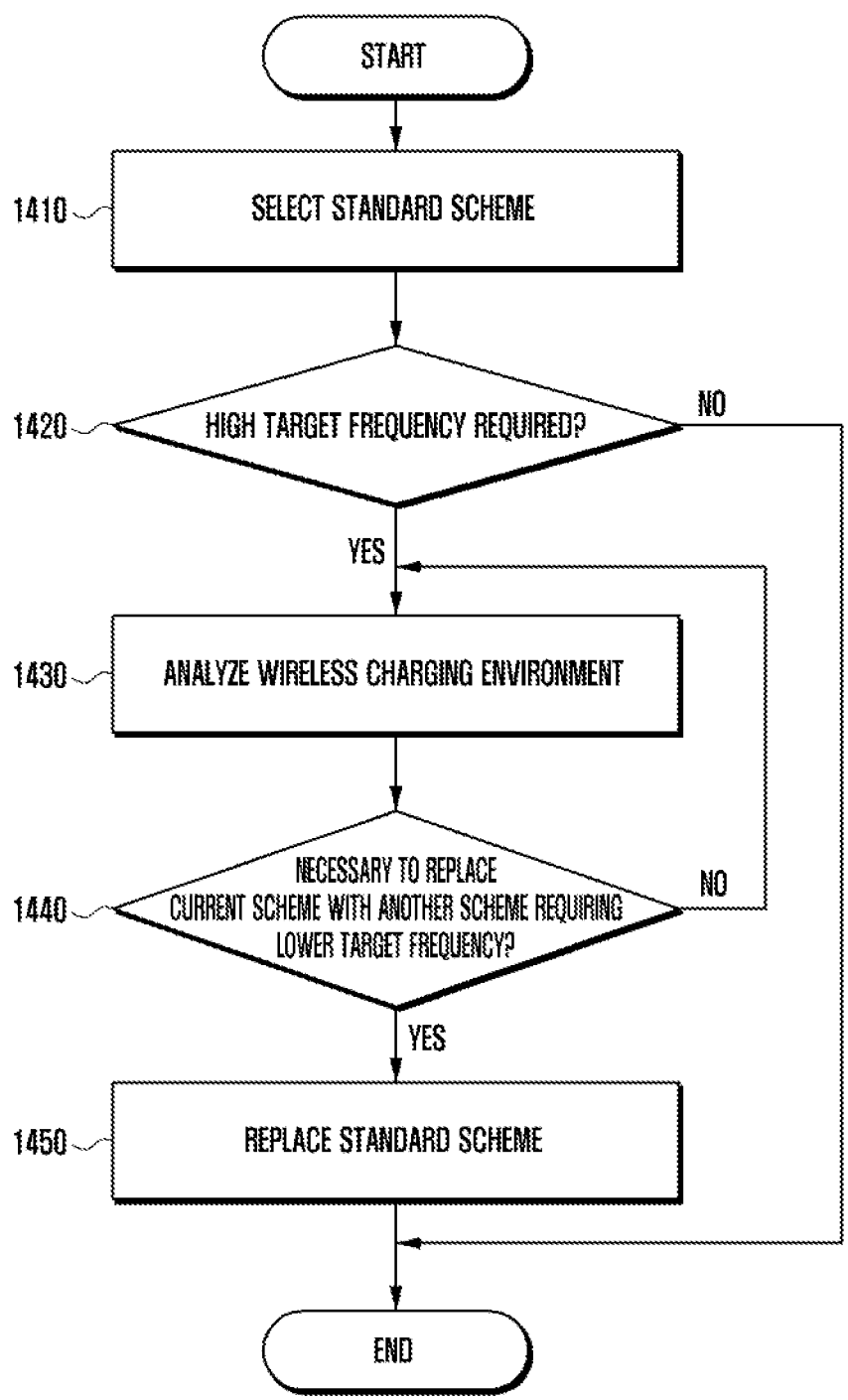
FIG. 14 is a flowchart of a procedure for selecting a standard scheme in consideration of wireless charging environment information according to an embodiment of the present disclosure.

FIG. 14 is a flowchart of a procedure for selecting a standard scheme in consideration of wireless charging environment information according to an embodiment of the present disclosure.

Referring to FIG. 14, at operation 1410, the electronic device 101 (e.g. standard scheme selector 510) selects a wireless power transfer scheme. For example, one of the WPC, PMA, A4WP standard schemes or a non-standard scheme may be selected. The electronic device 101 may configure settings for the number of channels to operate, and the frequency and duty cycle of the gate input signal according to the selected wireless power transfer scheme.

At operation 1420, the electronic device 101 checks whether the wireless power transfer scheme requires a relatively high target frequency in comparison to another wireless power transfer scheme. For example, while the A4WP standard scheme permits a relatively high target frequency of 6.78 MHz, the WPC or PMA standard scheme permits a relatively low target frequency ranging from 100 to 300 KHz. In general, compared with a standard scheme requiring a low target frequency, a standard scheme permitting a high target frequency may be disadvantageous in terms of EMI, heating, and wireless communication load.

At operation 1430, the electronic device 102, acting as a wireless charging transmitter, analyzes information regarding wireless charging environments.

In one embodiment, when the efficiency of wireless charging between the wireless charging transmitter (e.g. electronic device 102) and the wireless charging receiver (e.g. electronic device 101) is above a preset threshold, the electronic device 101 may determine that the wireless charging condition is good or acceptable. For example, when the wireless charging receiver is accurately placed in the charging region of the wireless charging transmitter 102, the wireless charging efficiency may be relatively high. When the wireless charging receiver is not accurately placed in the charging region of the wireless charging transmitter 102, the wireless charging efficiency may be relatively low.

In one embodiment, the electronic device 101 may examine the temperature of the wireless charging receiver. For example, when the temperature of the wireless charging receiver is above a preset threshold, the electronic device 101 may determine that the wireless charging condition is poor. In this case, heating or high temperature may degrade the performance of the wireless charging receiver.

In one embodiment, the electronic device 101 may examine the wireless communication load of the wireless charging receiver. When the wireless communication load of the wireless charging receiver is above a preset threshold, the electronic device 101 may determine that the wireless charging condition is poor. For example, heavy communication traffic in Wi-Fi or BT low energy (BLE) may cause crosstalk in communication, disrupting charging through wireless power transmission.

At operation 1440, the electronic device 101 determines whether it is necessary to replace the current wireless power transfer scheme with another scheme requiring a lower target frequency on the basis of the result of analysis of wireless charging environments. For example, when the A4WP standard scheme is currently selected, the electronic device 101 may determine whether it is necessary to replace the A4WP standard scheme with the WPC or PMA standard scheme.

In one embodiment, the electronic device 101 may determine whether to replace the current wireless power transfer scheme on the basis of at least one of wireless charging efficiency, temperature of the wireless charging receiver, and wireless communication load of the wireless charging receiver. For example, when the wireless charging efficiency is high as the wireless charging receiver is accurately placed in the charging region of the wireless charging transmitter, when it is necessary to cool down the heat of the wireless charging receiver due to internal heating, or when reception is poor owing to heavy wireless communication load of the wireless charging receiver, the electronic device 101 may determine that it is necessary to replace the current wireless power transfer scheme with another scheme requiring a lower target frequency.

Upon determining that it is necessary to replace the current wireless power transfer scheme, at operation 1450, the electronic device 101 replaces the current wireless power transfer scheme with another scheme requiring a lower target frequency on the basis of the result of determination at operation 1440.

According to various embodiments of the present disclosure, a method of wireless power transmission for an electronic device may include selecting a wireless power transfer scheme, changing the frequency of a signal in conformance with the wireless power transfer scheme, changing the duty cycle of the signal in conformance with the wireless power transfer scheme, and transmitting power with the frequency and duty cycle to an external electronic device.

Changing the frequency may include adjusting the capacitance of a variable capacitor.

Changing the duty cycle may include adjusting the resistance of a variable resistor.

The method may further include adjusting the number of wireless power transmission channels in conformance with the wireless power transfer scheme.

The method may further include: checking whether the duty cycle is 50 percent; performing, when the duty cycle is not 50 percent, adjustment so that the duty cycle becomes 50 percent; and performing, when the duty cycle is 50 percent, maintenance so that the duty cycle remains 50 percent.

Selecting a wireless power transfer scheme may include: analyzing information regarding a wireless charging environment; and replacing the current wireless power transfer scheme with another wireless power transfer scheme on the basis of the analysis result.

The information regarding the wireless charging environment may include information on the charging efficiency of the wireless charging receiver, information on the temperature of the wireless charging receiver, information on the wireless communication load of the wireless charging receiver, or any combination thereof.

The wireless power transfer scheme may be one of standard schemes for wireless charging or a non-standard scheme.

The standard schemes for wireless charging may conform to at least one of the WPC standard, the PMA standard, and the A4WP standard.

Changing the frequency may include increasing the capacitance of the variable capacitor to decrease the frequency, and decreasing the capacitance of the variable capacitor to increase the frequency.

Changing the duty cycle may include increasing the resistance of the variable resistor to decrease the duty cycle and decreasing the resistance of the variable resistor to increase the duty cycle.

The method may further include adjusting the resistance of a variable resistor in a duty cycle change circuit in accordance with the output voltage of a 50% duty cycle check circuit.

Adjusting the resistance of a variable resistor may include decreasing the resistance of the variable resistor when the output voltage is below zero, increasing the resistance when the output voltage is above zero, and maintaining the current resistance when the output voltage is zero.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an ASIC chip, a FPGA, and a programmable-logic device for performing certain operations which have been known or are to be developed in the future.

Examples of computer-readable media include: magnetic media, such as hard disks, floppy disks, and magnetic tape; optical media such as compact disc read only memory (CD-ROM) disks and DVD; magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

According to various embodiments of the present disclosure, there is provided a storage medium storing instructions that cause, when executed, at least one processor to carry out one or more operations. The instructions may cause the processor to select a wireless power transfer scheme, to change the frequency of a signal in conformance with the wireless power transfer scheme, to change the duty cycle of the signal in conformance with the wireless power transfer scheme, and to transmit power with the frequency and duty cycle to an external electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
 a frequency change circuit configured to produce a first signal of a frequency corresponding to at least one wireless power transfer scheme;
 a duty cycle change circuit configured to produce a second signal of a duty cycle corresponding to the at least one wireless power transfer scheme; and
 a control unit configured to control at least one of the frequency change circuit and the duty cycle change circuit according to the at least one wireless power transfer scheme,
 wherein the duty cycle change circuit includes a variable resistor, and
 wherein the duty cycle change circuit is further configured to:
  receive a duty adjustment signal corresponding to the at least one wireless power transfer scheme from the control unit,
  adjust a resistance of the variable resistor according to the duty adjustment signal, and
  output the second signal.

2. The electronic device of claim 1, wherein the at least one wireless power transfer scheme comprises standard or non-standard schemes for wireless charging.

3. The electronic device of claim 2, wherein the standard schemes for wireless charging conform to at least one of a wireless power consortium (WPC) standard, a power matters alliance (PMA) standard, or an alliance for wireless power (A4WP) standard.

4. The electronic device of claim 1,
 wherein the frequency change circuit includes a variable capacitor, and
 wherein the frequency change circuit is further configured to:
  receive a frequency adjustment signal corresponding to the at least one wireless power transfer scheme from the control unit,
  adjust a capacitance of the variable capacitor according to the frequency adjustment signal, and
  output the first signal.

5. The electronic device of claim 4, wherein the frequency change circuit is further configured to:
 decrease the frequency of the first signal with an increasing capacitance, and
 increase the frequency of the first signal with a decreasing capacitance.

6. The electronic device of claim 1,
 wherein the duty cycle change circuit includes a comparator, and
 wherein the duty cycle change circuit is further configured to output the second signal by comparing the first signal with a voltage across the variable resistor.

7. The electronic device of claim 6, wherein the duty cycle change circuit is further configured to:
 decrease the duty cycle of the second signal with an increasing resistance of the variable resistor, and
 increase the duty cycle of the second signal with a decreasing resistance thereof.

8. The electronic device of claim 1, further comprising a channel control circuit configured to:
 receive a channel control signal corresponding to the at least one wireless power transfer scheme from the control unit, and
 adjust a number of wireless power transmission channels according to the channel control signal.

9. The electronic device of claim 1, further comprising a power transmission circuit configured to transmit power with the frequency and duty cycle to an external electronic device.

10. The electronic device of claim 1, further comprising a 50% duty cycle check circuit configured to examine whether the duty cycle of the second signal is 50 percent.

11. The electronic device of claim 10,
wherein the 50% duty cycle check circuit includes an operational amplifier, and
wherein the 50% duty cycle check circuit is further configured to send a third signal indicating an output voltage of the operational amplifier to the control unit.

12. The electronic device of claim 11,
wherein the duty cycle change circuit includes a variable resistor, and
wherein the control unit is further configured to:
decrease the resistance of the variable resistor when the third signal is below zero,
increase the resistance when the third signal is above zero, and
maintain a current resistance when the third signal is zero.

13. An electronic device comprising:
a frequency change circuit;
a 50% duty cycle check circuit
a duty cycle change circuit; and
a processor functionally connected to the frequency change circuit and the duty cycle change circuit,
wherein the processor is configured to:
select at least one wireless power transfer scheme,
operate the frequency change circuit to change a frequency of a signal in conformance with the at least one wireless power transfer scheme,
operate the duty cycle change circuit to change a duty cycle of the signal in conformance with the at least one wireless power transfer scheme, and
transmit power with the frequency and duty cycle to an external electronic device, and
wherein the processor is further configured to:
check whether the duty cycle of the signal is 50 percent by use of the 50% duty cycle check circuit, and
adjust a resistance of a variable resistor in the duty cycle change circuit in accordance with an output voltage of the 50% duty cycle check circuit.

14. The electronic device of claim 13, wherein the processor is further configured to change the frequency by adjusting a capacitance of a variable capacitor in the frequency change circuit.

15. The electronic device of claim 13, wherein the processor is further configured to change the duty cycle by adjusting the resistance of a variable resistor in the duty cycle change circuit.

16. The electronic device of claim 13, further comprising:
a channel control circuit,
wherein the processor is further configured to adjust a number of wireless power transmission channels in conformance with the at least one wireless power transfer scheme by use of the channel control circuit.

17. The electronic device of claim 13, wherein the processor is further configured to:
decrease the resistance of the variable resistor when the output voltage is below zero,
increase the resistance when the output voltage is above zero, and
maintain the a current resistance when the output voltage is zero.

18. A method of wireless power transmission for an electronic device, the method comprising:
selecting at least one wireless power transfer scheme;
changing a frequency of a signal in conformance with the at least one wireless power transfer scheme;
changing a duty cycle of the signal in conformance with the at least one wireless power transfer scheme; and
transmitting power with the frequency and duty cycle to an external electronic device,
wherein the changing of the duty cycle comprises adjusting a resistance of a variable resistor.

19. The method of claim 18, wherein the changing of the frequency comprises adjusting a capacitance of a variable capacitor.

20. The method of claim 18, further comprising adjusting a number of wireless power transmission channels in conformance with the at least one wireless power transfer scheme.

21. The method of claim 18, further comprising:
checking whether the duty cycle of the signal is 50 percent;
performing, when the duty cycle is not 50 percent, adjustment so that the duty cycle becomes 50 percent; and
performing, when the duty cycle is 50 percent, maintenance so that the duty cycle remains 50 percent.

22. The method of claim 18, wherein the selecting of the at least one wireless power transfer scheme comprises:
analyzing information regarding a wireless charging environment; and
replacing a current wireless power transfer scheme with another wireless power transfer scheme on a basis of the analysis result.

23. The method of claim 22, wherein the information regarding the wireless charging environment comprises information on a charging efficiency of a wireless charging receiver, information on a temperature of the wireless charging receiver, information on a wireless communication load of the wireless charging receiver, or any combination thereof.

* * * * *